United States Patent [19]

Rahman et al.

[11] Patent Number: 5,795,074
[45] Date of Patent: Aug. 18, 1998

[54] GROOVED HYDRODYNAMIC THRUST BEARING

[75] Inventors: Mohamed M. Rahman, San Jose; Hans Leuthold, Santa Cruz; Wesley Clark, Watsonville, all of Calif.

[73] Assignee: Seagate Technology, Inc., Scotts Valley, Calif.

[21] Appl. No.: 750,486

[22] PCT Filed: Oct. 8, 1996

[86] PCT No.: PCT/US96/16155

§ 371 Date: Dec. 9, 1996

§ 102(e) Date: Dec. 9, 1996

[87] PCT Pub. No.: WO97/25543

PCT Pub. Date: Jul. 17, 1997

[51] Int. Cl.[6] .................................................. F16C 32/00
[52] U.S. Cl. ........................................ 384/123; 384/121
[58] Field of Search ............................... 384/121, 123, 384/107, 112, 292, 368

[56] References Cited

U.S. PATENT DOCUMENTS 3,870,382  3/1975  Reinhoudt .................... 384/123
4,728,201  3/1988  Abbe ............................ 384/121
5,433,529  7/1995  Hensel .......................... 384/112
5,492,341  2/1996  Pecht et al. ................ 384/123 X

FOREIGN PATENT DOCUMENTS 2201514  4/1974  France.
2201732  4/1974  France.
1 446 950  8/1976  United Kingdom.

Primary Examiner—Thomas R. Hannon
Attorney, Agent, or Firm—LaRiviere, Grubman & Payne

[57] ABSTRACT

Two thrust bearing surfaces are separated by bearing fluid and are rotatable relative to one another. One of the bearing surfaces defines a plurality of continuous lands extending from an inner to an outer radius of the bearing surface. Adjacent lands define between them a continuous groove which has an undivided portion in an inner annulus and a divided portion in an outer annulus of the bearing surface. The continuous groove is divided in the divided portion by an intermediate land located between the adjacent continuous lands. The divided portion of the continuous groove communicates in unbroken fashion with the divided portion.

12 Claims, 16 Drawing Sheets

5,795,074

GROOVED HYDRODYNAMIC THRUST BEARING

TECHNICAL FIELD

The present invention relates to hydrodynamic thrust bearing configuration for a spindle motor assembly. More specifically, the invention relates to the groove configuration of a hydrodynamic thrust bearing for use in a computer hard disc drive spindle motor assembly.

BACKGROUND OF THE INVENTION

Computer hard disc drives generally comprise an array of magnetic discs mounted to a spindle motor assembly. Data is written to, and read from, each magnetic disc by means of a read/write head located at the end of an arm which extends between the discs. Positioning of the arm is accomplished by means of a voice coil motor under the control of disc drive control electronics.

The array of magnetic discs is mounted to a hub of the spindle motor assembly. The hub is mounted for rotation with respect to a base of the spindle motor assembly by means of a bearing arrangement. In use, the hub is rotated by means of an electromagnetic motor.

In order to facilitate the accurate positioning of the read/write heads between the magnetic discs, the bearing arrangement is required to run substantially vibation-free and to have a small deflection under the application of external loads (i.e., have a high bearing stiffness). The bearing arrangement is also expected to have a long, maintenance-free service life. The continuous trend of min-iaturization in the computer industry has meant that the above functions have to be accomplished by a bearing arrangement which occupies as little volume as possible.

The bearing arrangements used in computer disc drive spindle motor assemblies are often hydrodynamic bearing arrangements, which include at least one hydrodynamic thrust bearing. The thrust bearing comprises a thrust plate and an opposed counter plate, each of which define a bearing surface. Either one of the bearing surfaces is formed with a pattern of grooves. The two bearing surfaces are separated in use by a film of lubricant. Pressures generated in the lubricant by the relative rotation of the bearing surfaces keep the bearing surfaces apart and ensure smooth rotation of the bearing arrangement.

The axial load bearing capacity and other static and dynamic characteristics of the thrust bearing depend on the pressure rise in the lubricant film and on the distribution of pressure across the thrust bearing. The pressure rise and distribution in turn depend on the design of the grooving pattern, e.g. the angle of the grooves, the groove pitch ratio, the groove depth and the center radius of the thrust or counter plate.

Current grooved thrust bearings have been designed with a view to maximizing bearing performance. This increased performance has been at the expense of ease of manufacture of the grooved bearing surface. In particular, groove densities and configurations have resulted in shortened lifespans of punch and die combinations used to form the groove pattern.

Accordingly, there is a need for a groove pattern which provides good thrust bearing performance without adversely affecting the manufacturability of the thrust bearing.

SUMMARY OF THE INVENTION

The present invention provides a grooved hydrodynamic thrust bearing comprising first and second bearing surfaces. The first and second bearing surfaces are rotatable relative to one another and are separated by a bearing fluid.

The first bearing surface defines a plurality of continuous lands extending from an inner radius to an outer radius. Adjacent continuous lands define between them a continuous groove having an approximately constant depth and extending in unbroken fashion between the inner radius and the outer radius. The continuous groove has an undivided portion in an inner annulus of the first bearing surface and a divided portion in an outer annulus of the first bearing surface, and is divided in the divided portion by an intermediate land located between the two adjacent continuous lands. The divided portion of the continuous groove communicates in unbroken fashion with the undivided portion of the continuous groove.

Other features of the present invention are disclosed or apparent in the section entitled: "BEST MODE FOR CARRYING OUT THE INVENTION."

BRIEF DESCRIPTION OF THE DRAWINGS

For fuller understanding of the present invention, reference is made to the accompanying drawings in the following detailed description of the Best Mode of Carrying Out the Present Invention. In the drawings.

BEST MODE FOR CARRYING OUT THE INVENTION

As hard disc drives and spindle motors are both well-known in the art, in order to avoid confusion while enabling those skilled in the art to practice the claimed invention, this specification omits many details with respect to known items.

Figure 1:
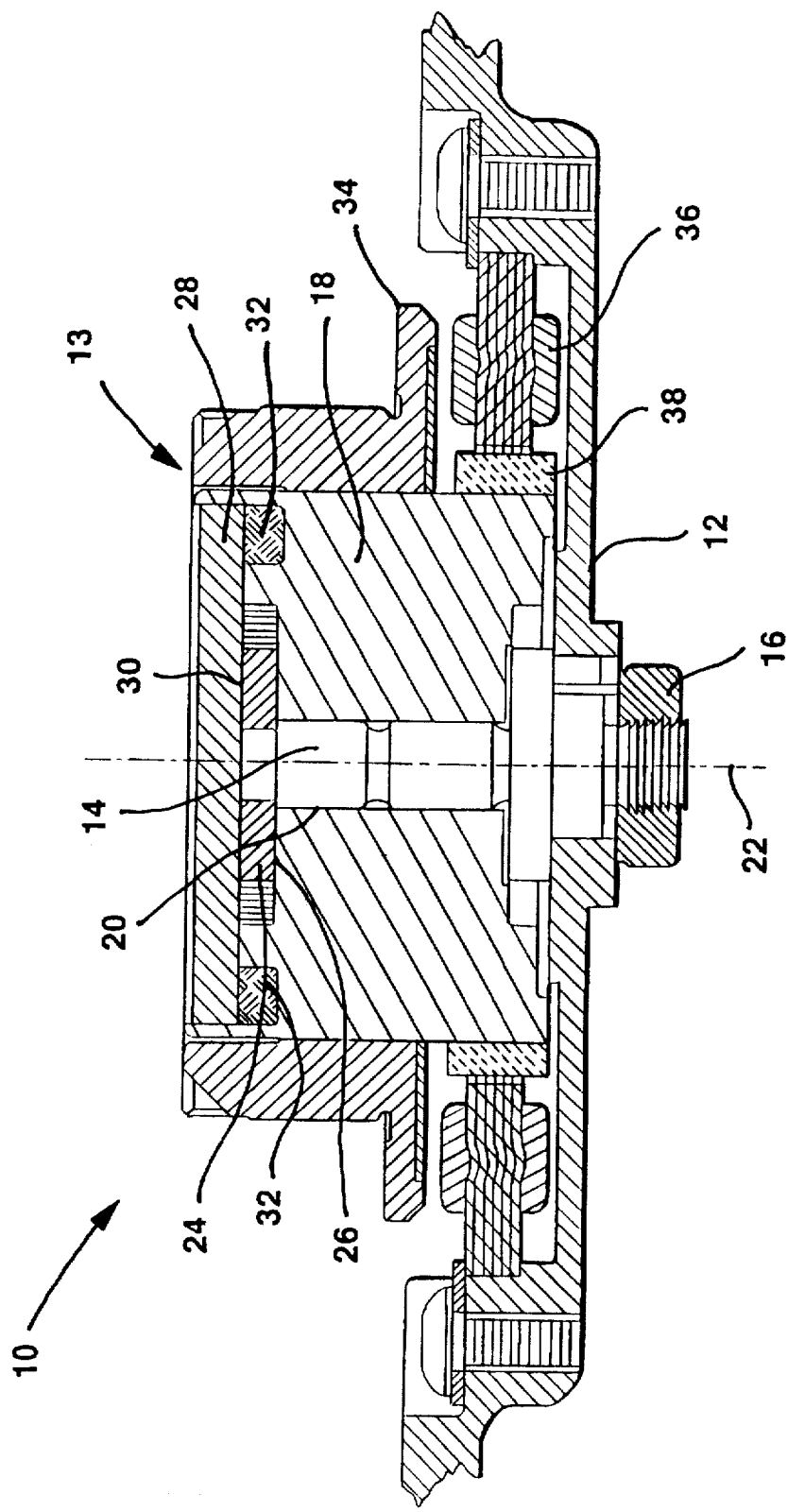
FIG. 1 is a cross section through a spindle motor assembly incorporating a hydrodynamic thrust bearing according to the invention.

FIG. 1 illustrates a cross section through a spindle motor assembly incorporating a hydrodynamic thrust bearing according to the invention. The spindle motor assembly, generally indicated by the numeral 10, comprises a base 12 and a hub assembly 13.

A shaft 14 is mounted to the base 12 by means of a nut 16.

The outer surface of the shaft 14 and the adjacent bore of a journal 18 together form a hydrodynamic journal bearing 20. The hydrodynamic journal bearing 20 includes a grooved surface provided on the shaft 14 or on the bore of the journal 18. The journal bearing 20 supports the journal 18 for rotation relative to the shaft 14 about axis 22.

A thrust plate 24 is press-fitted to one end of the shaft 14 and extends transversely to the shaft 14. The thrust plate 24 defines a first thrust surface which, together with an adjacent thrust surface on the journal 18, defines a first hydrodynamic thrust bearing 26.

A counter plate 28 is press-fitted to the journal 18 adjacent to the thrust plate 24. The counter plate 28 defines a counter plate thrust surface which, together with a second thrust surface defined by the thrust plate 24, forms a second hydrodynamic thrust bearing 30. The counter plate 28 is sealed to the journal 18 by means of an O-ring 32.

The first and second hydrodynamic thrust bearings 26, 30 each include a grooved bearing surface as described below with reference to FIG. 9. In this embodiment of the hydrodynamic bearing arrangement, these grooved surfaces are provided on the thrust plate 26. They could however alternatively be provided on the counter plate 30 and/or the adjacent surface of the journal 18.

A hub 34 is fitted around the journal 26. The hub 34 supports an array of magnetic discs (not shown).

The hub assembly 13 is rotated with respect to the base 12 in use by means of an electromagnetic motor. The electromagnetic motor comprises a stator assembly 36 mounted to the base 12, and a magnet 38 mounted to the journal 18.

The hydrodynamic thrust bearings 26 and 30 prevent any substantial linear movement of journal 18 relative to shaft 14 along axis 22.

Figure 2:
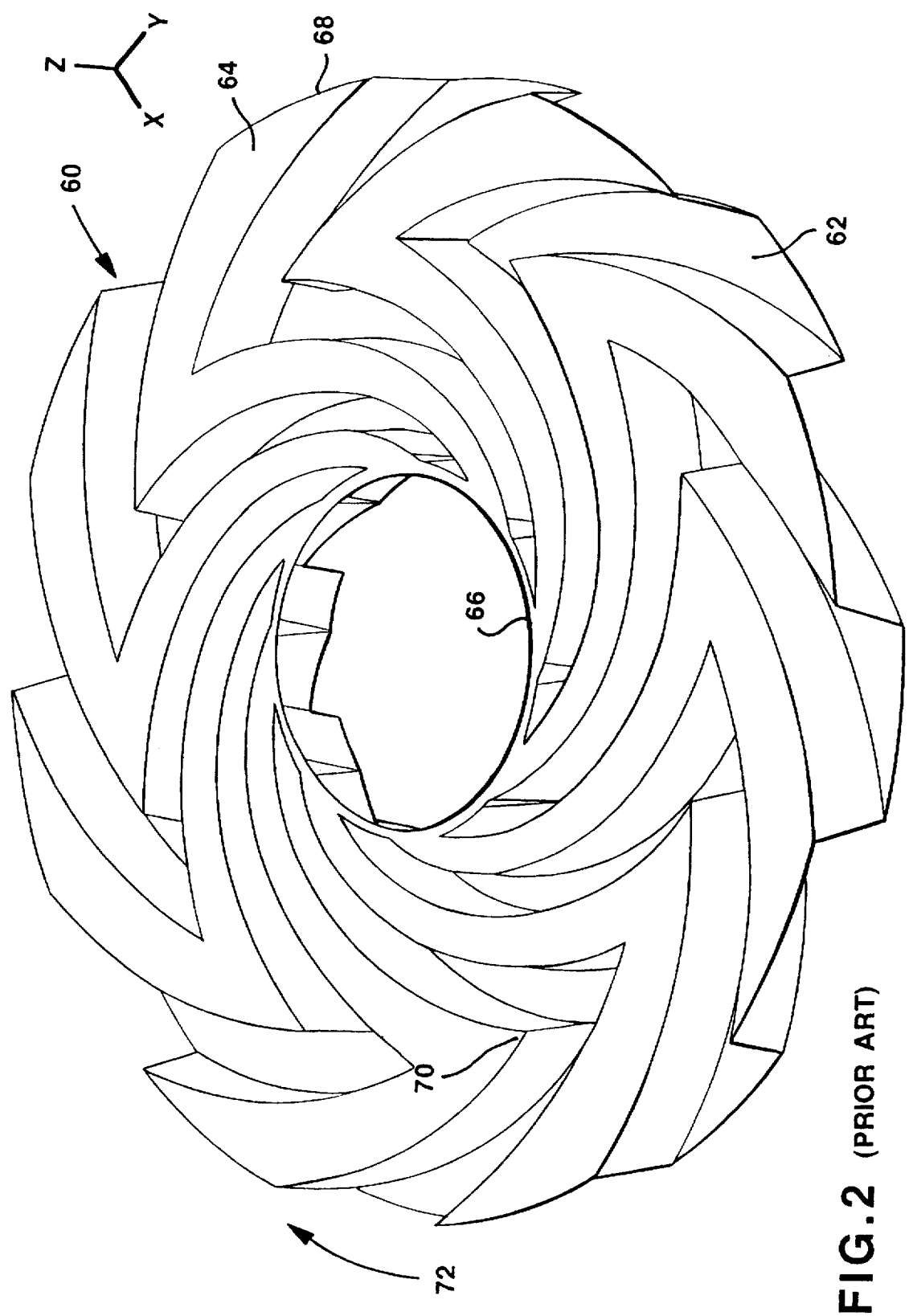
FIG. 2 is a schematic perspective view of one of the surfaces of a prior art hydrodynamic thrust bearing.

The operation of a hydrodynamic bearing can best be understood by reference to FIG. 2, which illustrates a schematic perspective view of one of the surfaces of a prior art hydrodynamic thrust bearing.

The illustrated hydrodynamic bearing surface, generally indicated by the numeral 60, comprises a series of alternating grooves 62 and lands 64. For purposes of illustration, the diameter of the hydrodynamic bearing surface 60 and the depth of the grooves 62 have been greatly exaggerated.

Each groove 62 and land 64 comprises a leg which extends outward from the inner radius 66 of the hydrodynamic bearing surface 60 and a leg which extends inward from the outer radius 68 of the hydrodynamic bearing surface 60. The two legs meet in a point at an intermediate radius 70 which is referred to in the art as the center radius. The plurality of grooves 62 and lands 64 together form a curved herringbone pattern as illustrated in the figure.

A hydrodynamic thrust bearing is formed when the bearing surface 60 is placed adjacent to an opposed bearing surface with a film of lubricant between the two surfaces. When the bearing surface 60 is then rotated in the direction 72, that is, against the herringbone pattern, the grooves 62 and lands 64 tend to draw lubricant from the inner and outer radii 66 and 68 towards the points of the herringbone pattern at the center radius 70. This creates a pressure distribution within the lubricant and across the bearing surface 60 which serves to keep the two bearing surfaces apart under external loading.

Figure 3:
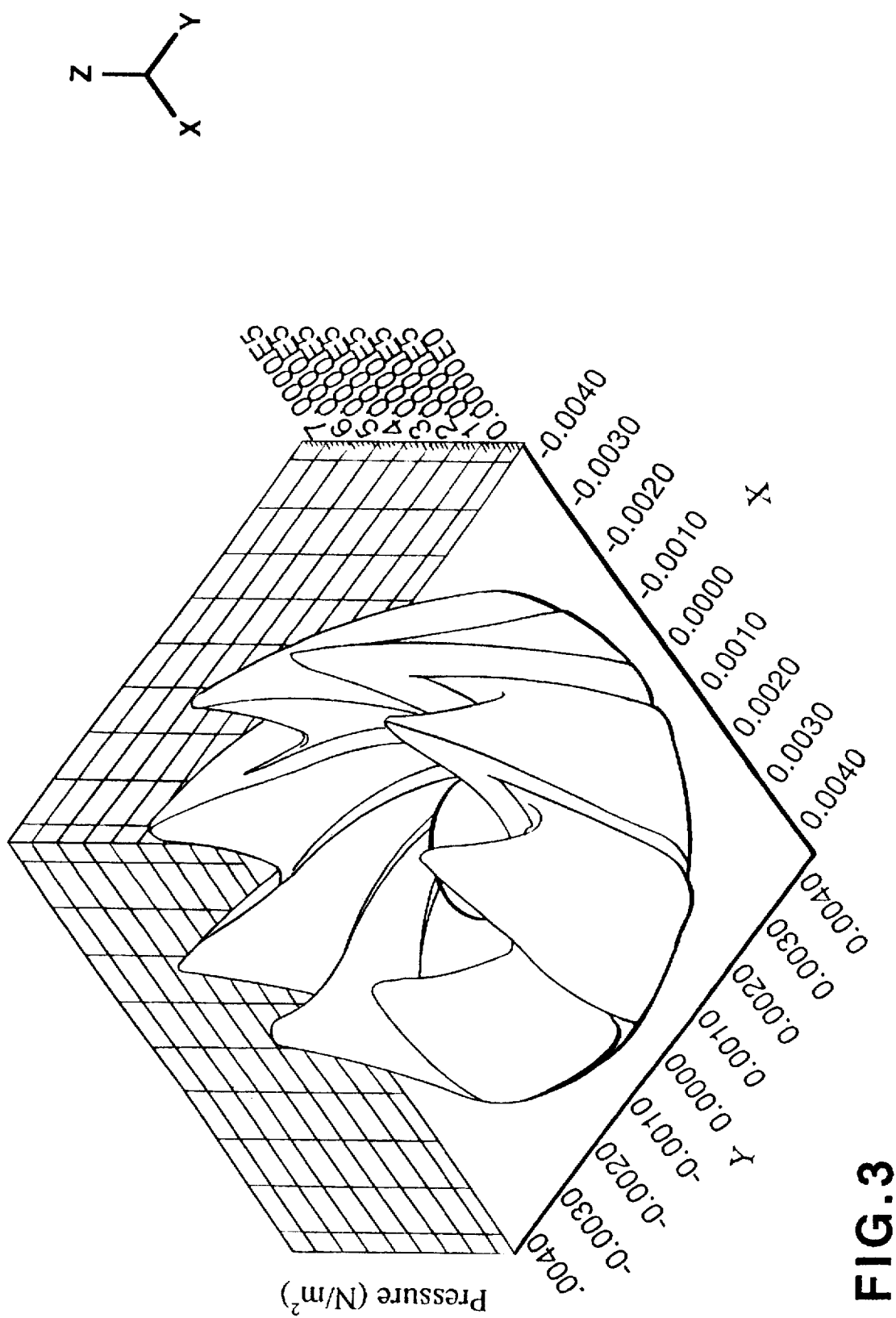
FIG. 3 is a perspective view of the pressure distribution created in the bearing fluid by the rotation of the hydrodynamic thrust bearing surface of FIG. 2.

The pressure distribution created across a hydrodynamic bearing incorporating the hydrodynamic bearing surface 60, which has eight grooves, is illustrated in FIG. 3. In this figure, the bearing arrangement has been loaded with 14.2N, and provides an axial bearing stiffness of 4260 kN/m and a bearing rocking stiffness of 14.27 Nm/rad.

When the numbers of grooves and lands on a bearing surface are increased, the bearing performance increases up to a point. The relationship between the bearing performance and the number of grooves is represented graphically in FIG. 4 by the line 80. As can be seen from FIG. 4, above about a certain number of grooves, no substantial increase in bearing performance is achieved.

Figure 4:
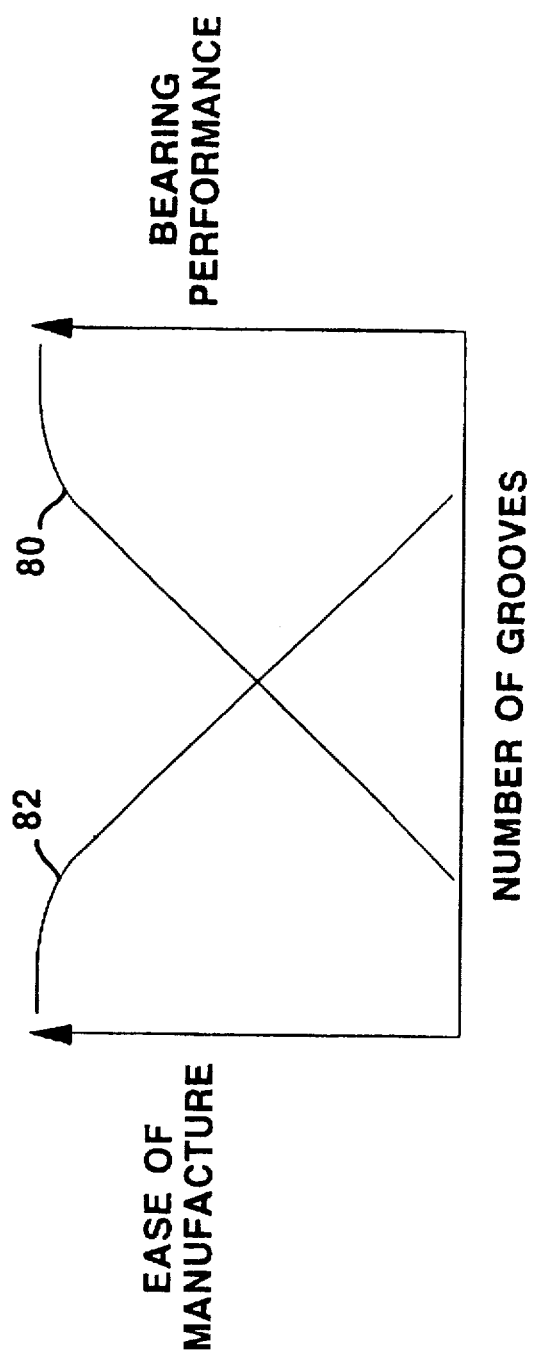
FIG. 4 is a graph illustrating the general relationship between the number of grooves formed in a hydrodynamic bearing surface, the ease of manufacture of the bearing surface, and bearing performance.

The relationship between the ease of manufacture of a grooved bearing surface and the number of grooves is represented in FIG. 4 by the line 82. As can be seen from the figure, the ease of manufacture is initially unchanged below a certain number of grooves, but it then decreases steeply as the number of grooves increases.

This relationship between the ease of manufacture of the bearing surface and the number of grooves can best be understood upon reference to FIG. 5.

Figure 5B:
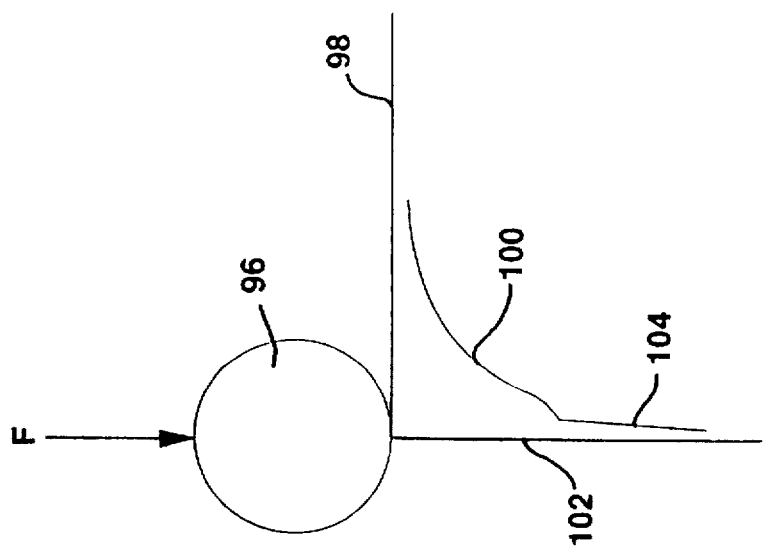
FIGS. 5(a), (b) and (c) show the stress distributions created in solid materials under certain loading conditions, to illustrate the stresses caused in punch features when forming grooved surfaces.
Figure 5A:
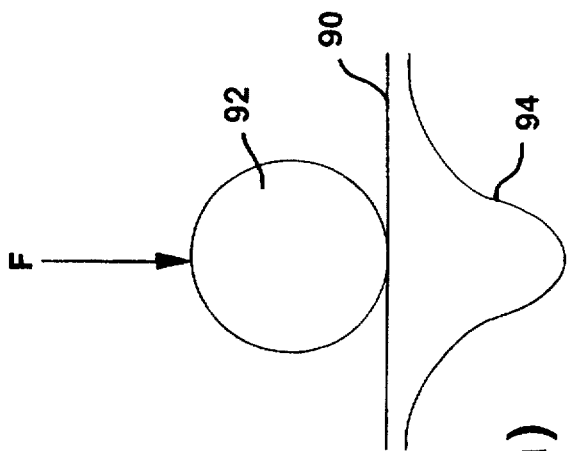

FIG. 5(a) illustrates the stress distribution across a flat surface 90 when a sphere 92 is pressed against the surface 90 with a force F. The stress distribution 94 has an inverted bell shape, with a peak directly under the center of the sphere 92.

FIG. 5(b) illustrates the stress distribution when a sphere 96 is pressed against the corner of a block 98 with a force F. The stress distribution follows the previous inverted bell shape in the block as indicated by the reference numeral 100, with a sharp increase in the stress distribution near the edge 102, as indicated by the reference numeral 104.

Figure 5C:
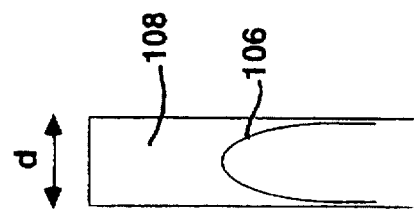

In a punch used to form a groove, the stress distribution in the punch can be approximated as the sum of two mirror images of the stress distributions 104 and 100 in FIG. 5(b). The resulting stress distribution is illustrated in FIG. 5(c) by the reference numeral 106. As the width "d" of the punch 108 decreases, as would be required to form narrower grooves, the average stress across the punch increases rapidly as the edge stress distribution 104 becomes dominant.

Therefor referring back to FIG. 3, generally, in order to increase bearing performance, more grooves are required, which decreases the width of each groove. The narrow grooves require narrower punch (or die) features to form them. The narrower punch features experience much greater stresses, which reduces punch life. This in turn decreases the ease of manufacturing of the grooved bearing surface.

Figure 6:
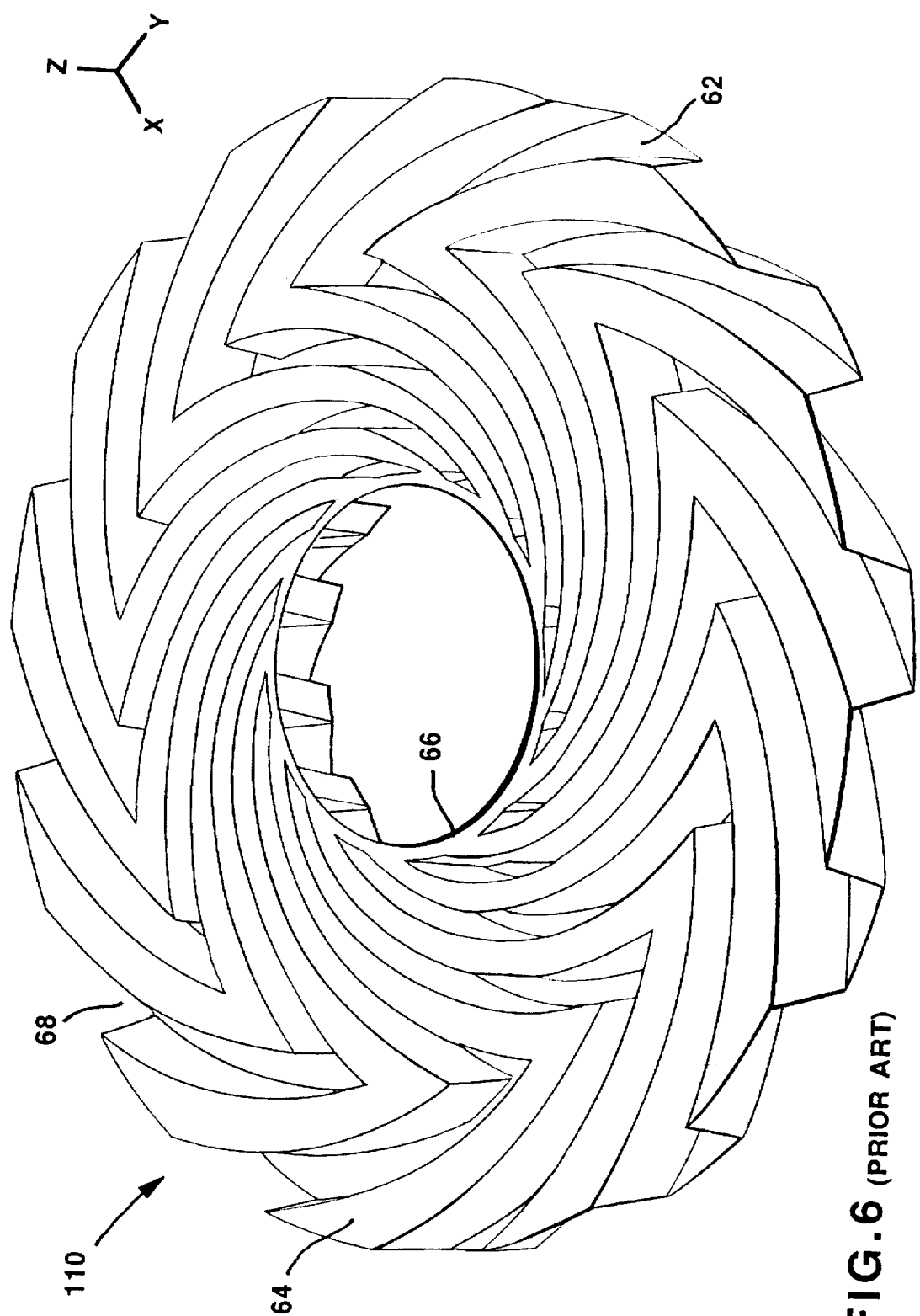
FIG. 6 is a schematic perspective view of one of the surfaces of a second prior art hydrodynamic thrust bearing.
Figure 7:
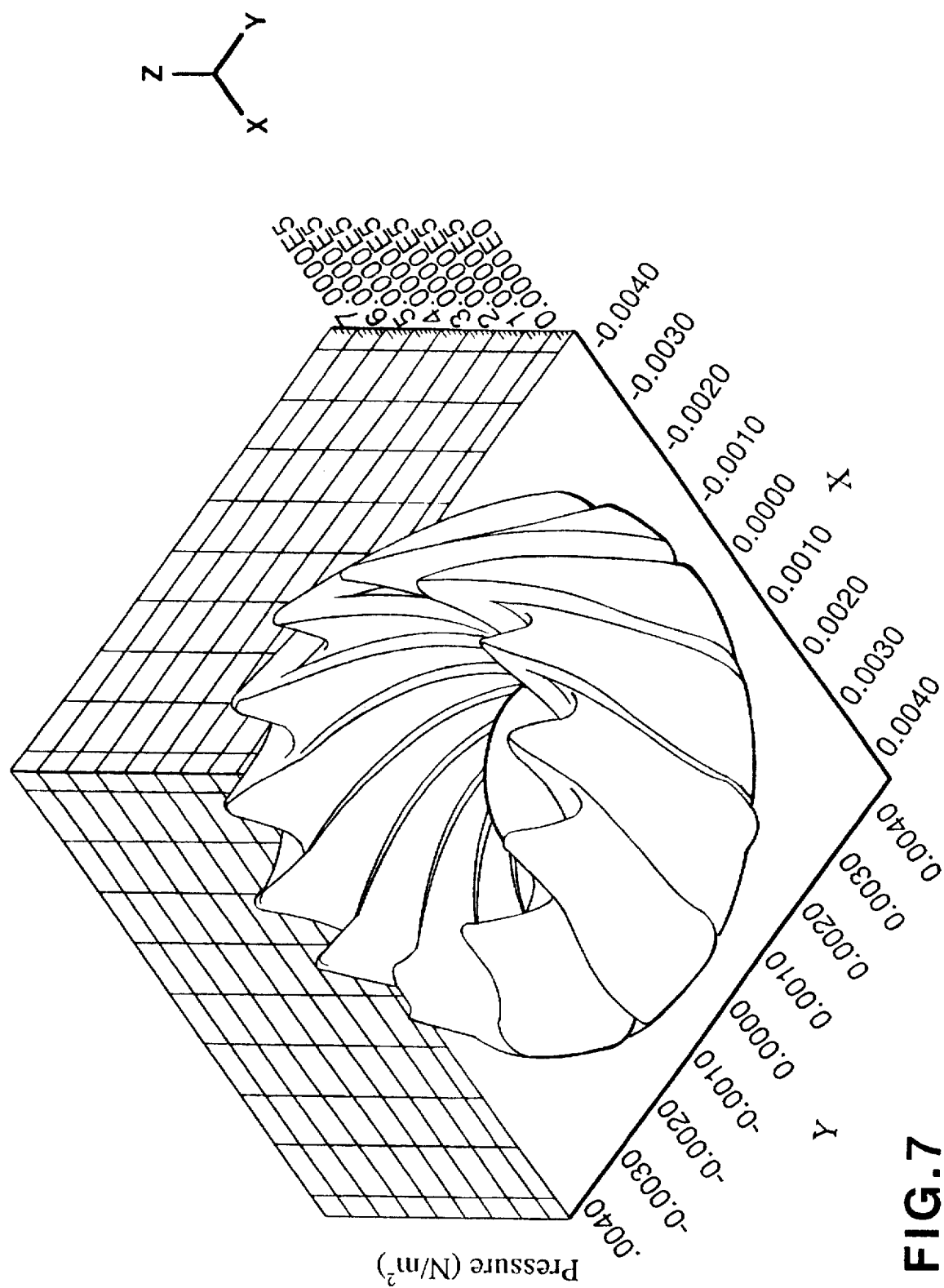
FIG. 7 is a perspective view of the pressure distribution created in the bearing fluid by the rotation of the hydrodynamic thrust bearing surface of FIG. 6.

Another prior art hydrodynamic bearing surface having twelve grooves is shown schematically in FIG. 6, and the pressure distribution created by this bearing surface is shown in FIG. 7. In this figure, the bearing arrangement has also been loaded with 14.2N, and provides an axial bearing stiffness of 4560 kN/m and a bearing rocking stiffness of 14.95 Nm/rad, an increase over the FIG. 2 configuration.

Comparing FIG. 2 with FIG. 6 and FIG. 3 with FIG. 7, it can be seen that increasing the number of grooves 62 from eight to twelve has resulted in a general increase in the pressure distribution across the bearing surface, but the width of the individual grooves 62 has decreased significantly.

Figure 8:
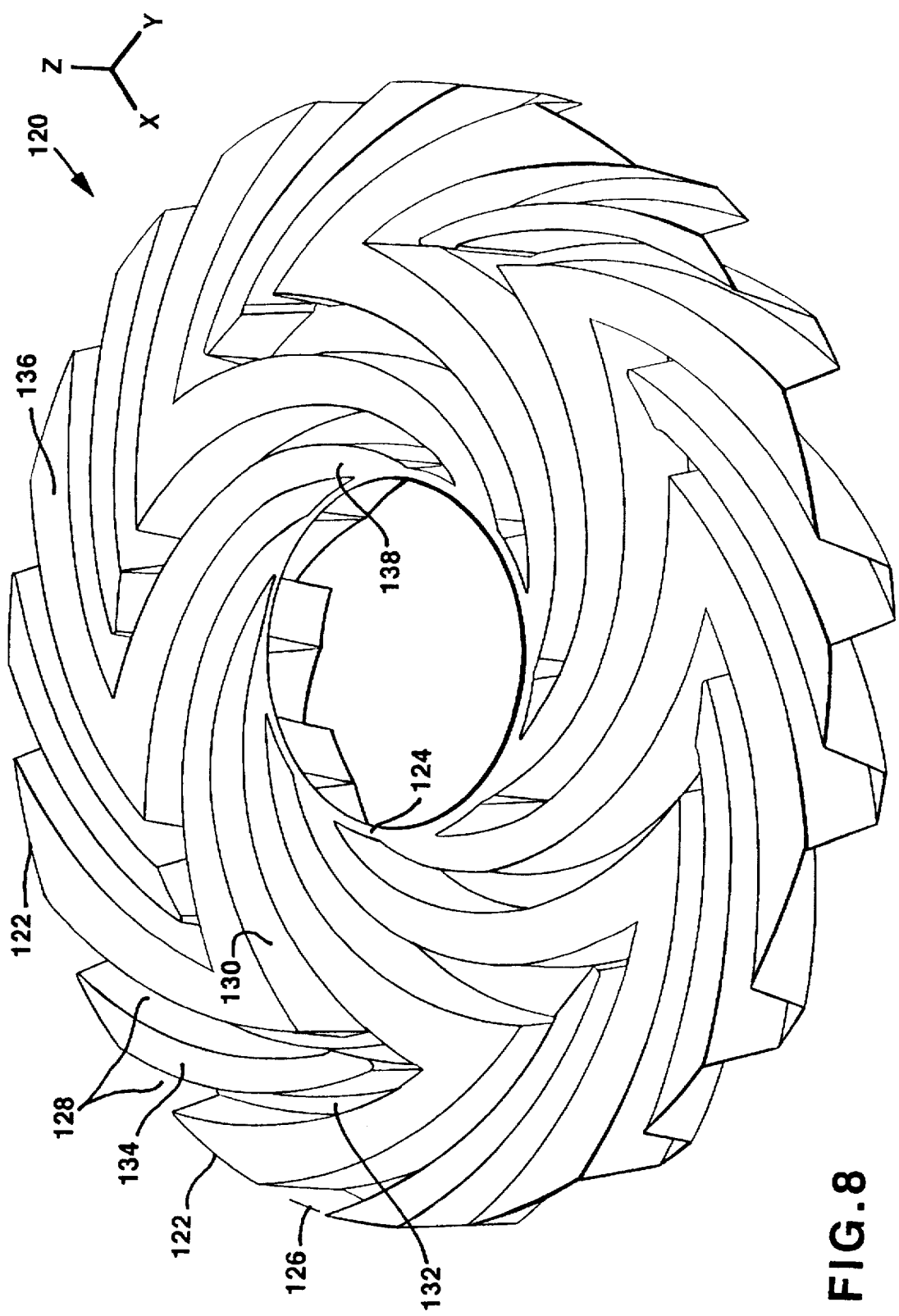
FIG. 8 is a schematic perspective view of one of the surfaces of a hydrodynamic thrust bearing according to the invention.
Figure 9:
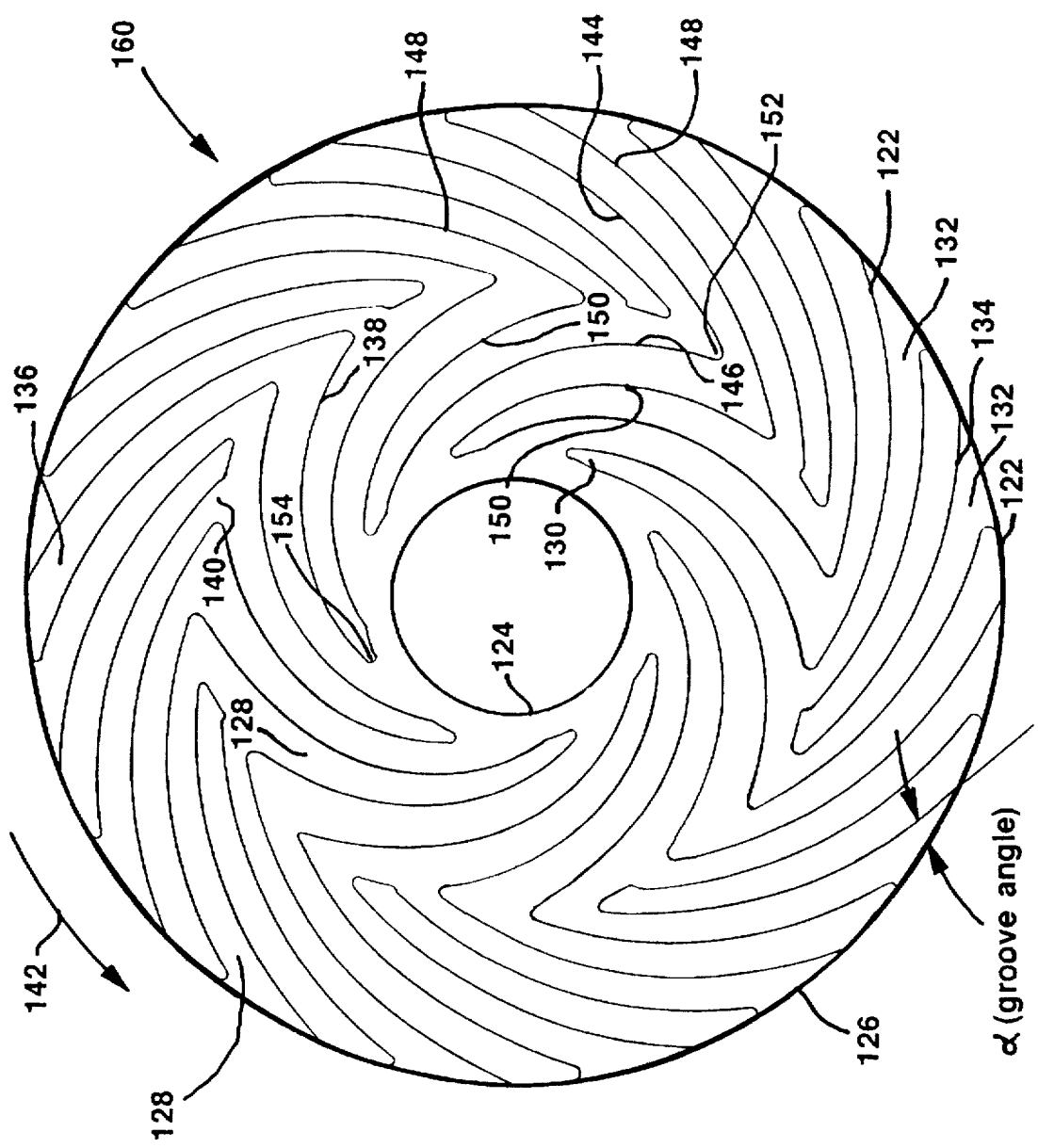
FIG. 9 is a plan view of one of the bearing surfaces of the best mode hydrodynamic thrust bearing according to the invention.

The bearing surface of a hydrodynamic thrust bearing according to the invention is shown in schematic perspective view in FIG. 8, and in plan view in FIG. 9. For purposes of convenience, features which are common to the bearing surfaces of FIGS. 8 and 9 have been indicated by the same reference numeral.

The bearing surface illustrated in FIG. 8, generally indicated by the numeral 120, defines a plurality of continuous lands 122. The continuous lands 122 extend from an inner radius 124 of the bearing surface 120, to an outer radius 126. Adjacent ones of the continuous lands 122 define between them a continuous groove 128 having an approximately constant depth, and extending in unbroken fashion between the inner radius 124 and the outer radius 126.

As can be seen from FIG. 8, each continuous groove 128 comprises an undivided portion 130 in an inner annulus of the bearing surface 120, and a divided portion 132 in an outer annulus of the bearing surface 120. The continuous groove is divided in the divided portion 132 by an intermediate land 134 located between the two adjacent continuous lands 122.

It should be noted that the divided portion 132 of the continuous groove 128 communicates in unbroken fashion with the undivided portion 130 of the continuous groove 128. This ensures that bearing lubricant can flow substantially unrestricted along the continuous groove between the inner and outer radii 124, 126. This smooth flow is believed to improve bearing performance, and ensures that there is not an undesirably high buildup of pressure or the occurrence of cavitation at any location across the bearing surface, which could increase the stresses experienced by the continuous lands 122 or the intermediate lands 134.

The continuous lands 122 each comprise a first leg 136 located in an outer annulus of the bearing surface 120, and a second leg 138 located in an inner annulus of the bearing surface 120, the first and second legs meeting at a center radius 140. The first and second legs 136, 138 are angled with respect to each other, and the continuous lands 122 define together with adjacent continuous lands 122, a curved herringbone pattern as illustrated in the figures.

Figure 10:
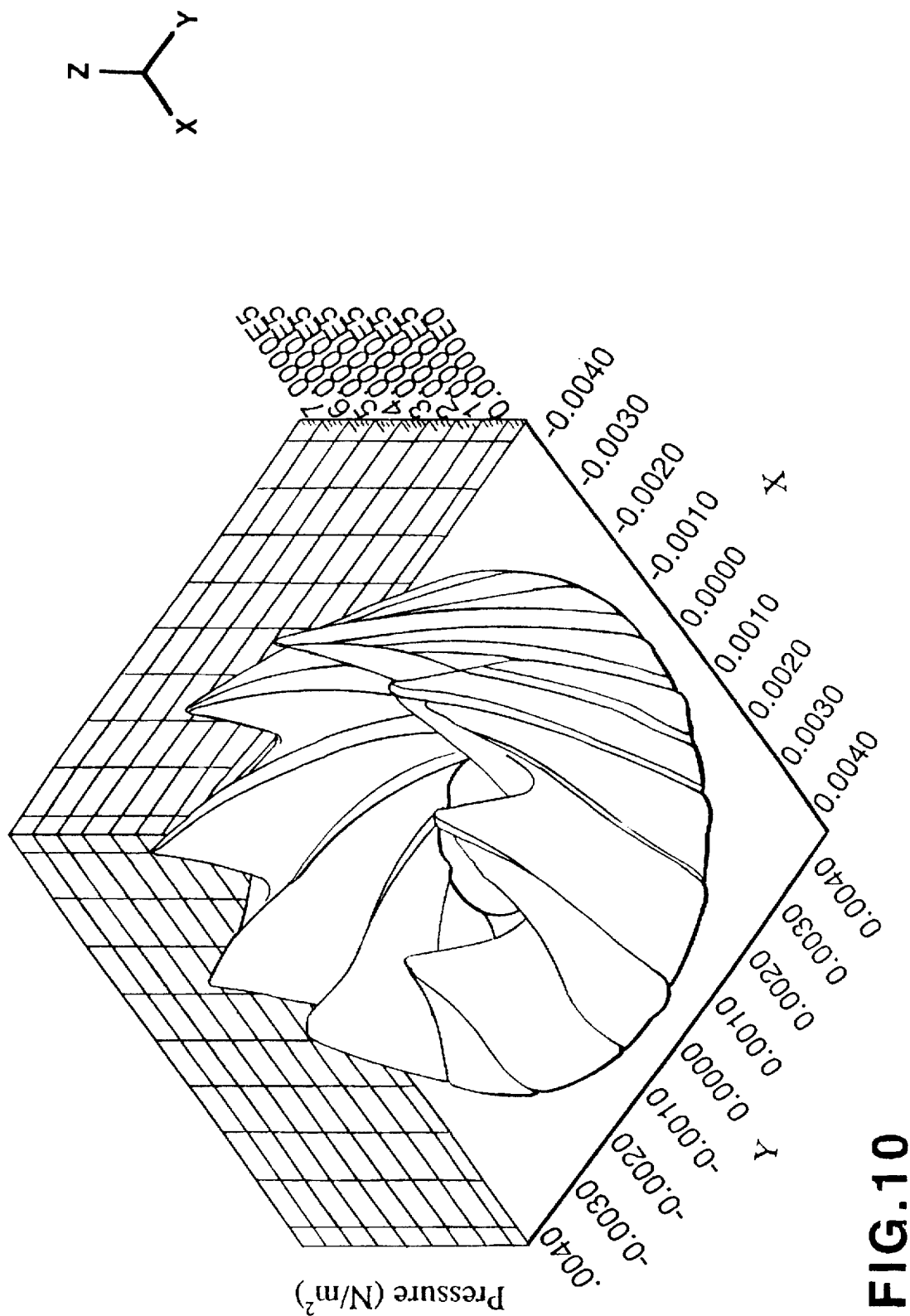
FIG. 10 is a perspective view of the pressure distribution created in the bearing fluid by the rotation of the hydrodynamic thrust bearing surface of FIG. 8.

The pressure distribution created by the FIG. 8 bearing surface is shown in FIG. 10. In this figure, the bearing arrangement has been loaded with 13.91N, and provides an axial bearing stiffness of 4810 kN/m and a bearing rocking stiffness of 15.37 Nm/rad, an increase over both the FIG. 2 and FIG. 6 configurations.

Referring now more particularly to FIG. 9, and considering the direction of rotation 142 of the bearing surface 120, it will be appreciated that the first and second legs 136, 138 of the continuous lands 122 each have leading edges 144, 146 and trailing edges 148, 150. Where the first and second legs 136, 138 meet in the vicinity of the center radius 140, the trailing edges 148, 150 form a smooth curve. In the illustrated embodiment of the invention, the smooth curve is a circular arc 152 having a radius of approximately 50 μm.

It can also be seen that where the leading edge 146 of a second leg 138 meets the trailing edge 150 of an adjacent second leg at the inner radius 124, a smooth curve is also formed. In the illustrated embodiment, the smooth curve is a circular arc 154 having a radius of approximately 25 μm.

The improvement in ease of manufacturability of the bearing surface 120 can best be appreciated by considering a punch used to form the bearing surface 120. Such a punch or die will be the inverse of the illustrated bearing surface 120. In other words, the punch will have raised surfaces corresponding to the continuous grooves 128, and grooves corresponding to the lands 122, 134.

Viewing FIG. 9 from this perspective, it can be seen that the raised surfaces of the punch are unbroken between the inner radius 124 and the outer radius 126.

The raised surfaces of the punch are also seen to be more uniformly broad between the outer radius 126 and the inner radius 124. Narrow areas on the raised surfaces of the punch, which would be subjected to undesirably high stresses as described above, are substantially illuminated by providing the smooth curves 152, 154.

Figure 11:
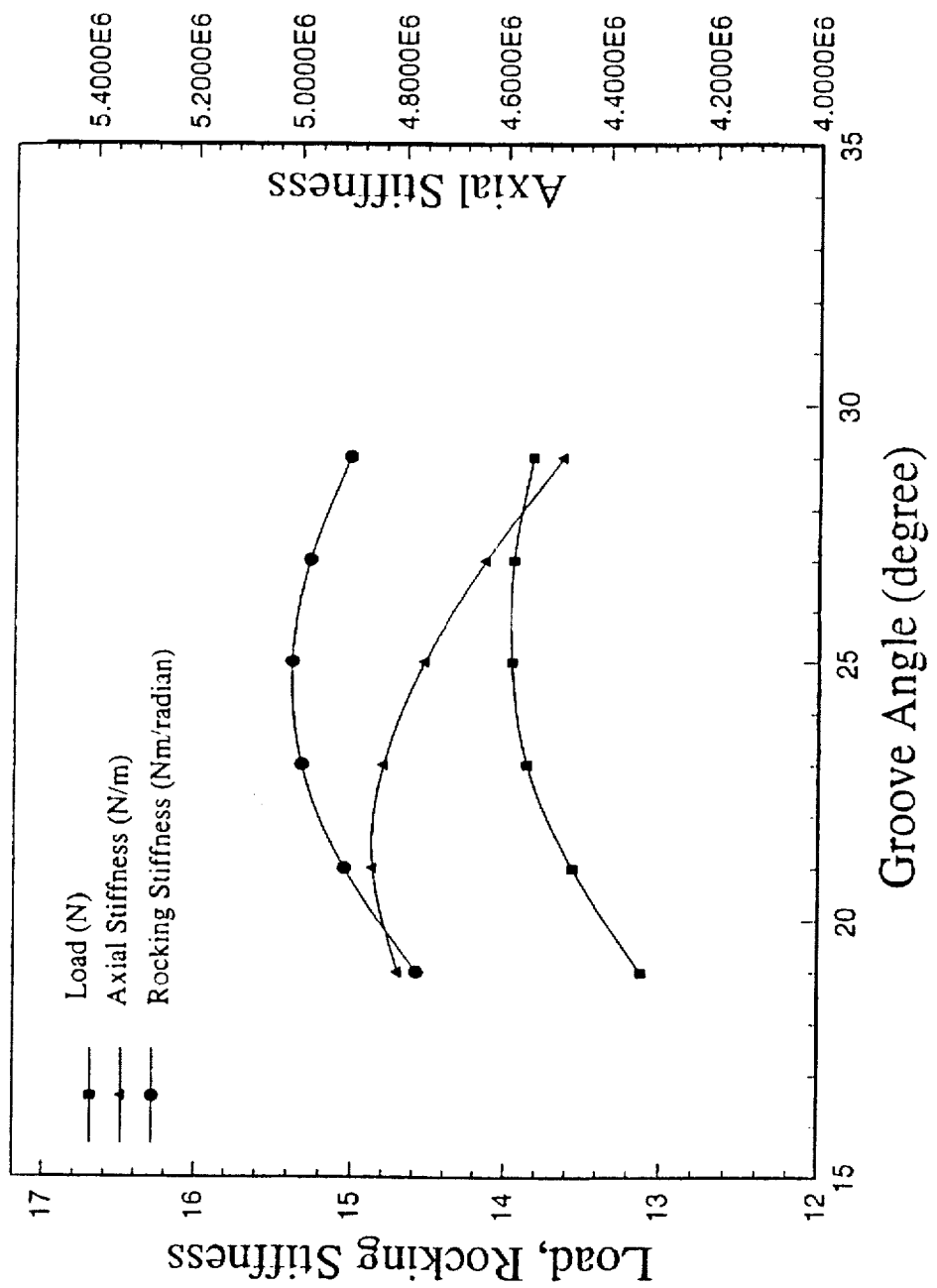
FIG. 11 is a graph illustrating the relationship between groove angle and bearing performance for a hydrodynamic bearing according to the invention.

Hydrodynamic bearing performance is also dependent on the groove angle ($\alpha$). Groove angle is defined as the angle between the tangent to the groove and the tangent to the circle at that point. Usually, the groove angle is kept constant for the inner grooves 130 and the outer grooves 132. The pumping action of the hydrodynamic bearing on the bearing fluid depends greatly on the groove angle, which in turn affects bearing performance. For the hydrodynamic, bearing surface of FIG. 9, the groove angle may vary from approximately 19° to approximately 29° depending on the particular bearing characteristics required, but is preferably approximately 23.5°. The relationship between groove angle and bearing performance is illustrated in FIG. 11.

Figure 12:
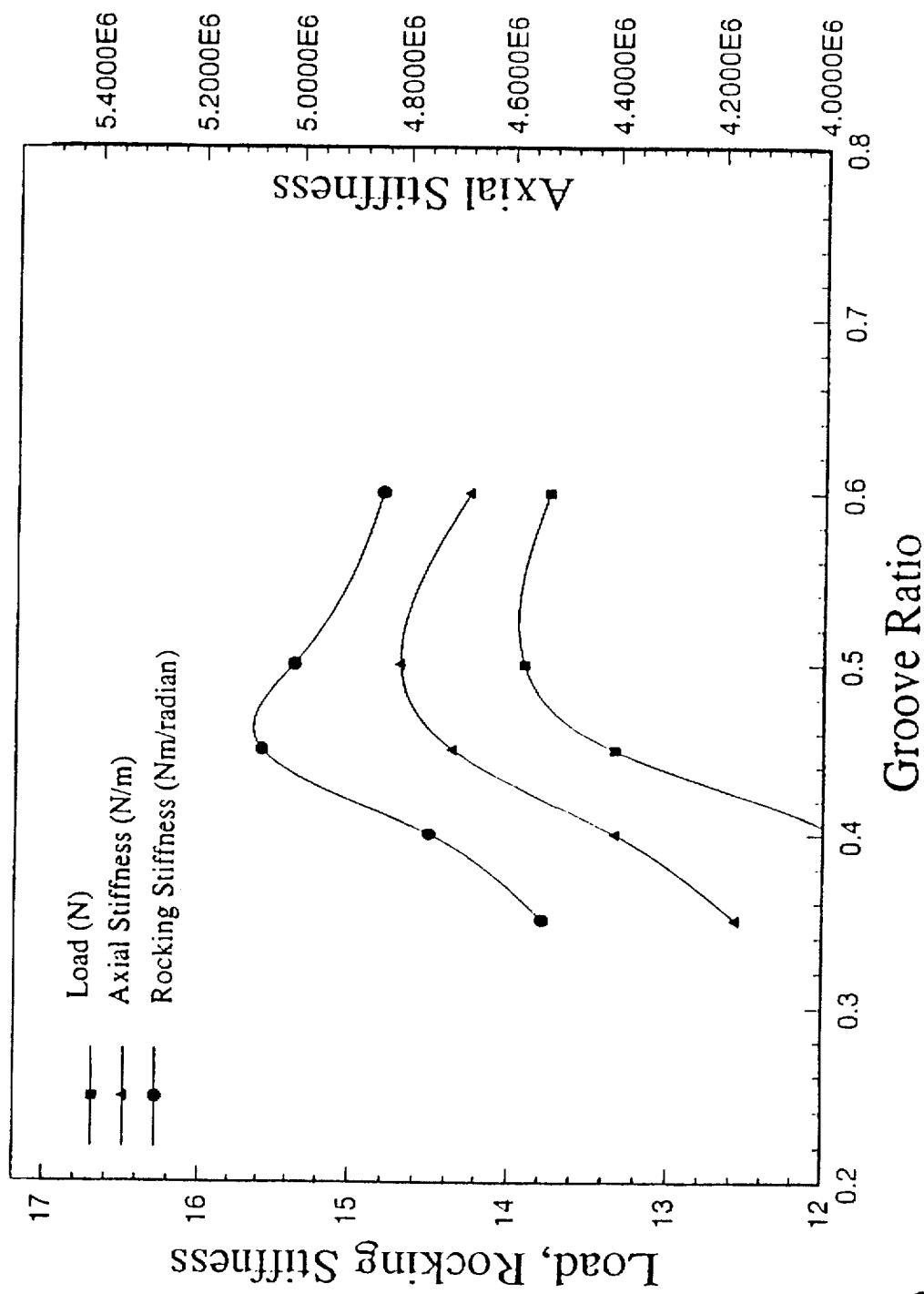
FIG. 12 is a graph illustrating the relationship between groove ratio and bearing performance for a hydrodynamic bearing according to the invention.

Similarly, the groove ratio is another parameter which affects the pumping action of the hydrodynamic bearing on the bearing fluid, and hence bearing performance. Groove ratio is defined as the ratio of the width of the groove to the width of the land, and may also be varied in a grooved hydrodynamic bearing according to the invention, from approximately 0.32 to approximately 0.6. The groove ratio is preferably approximately 0.5. The relationship between groove ratio and bearing performance is illustrated in FIG. 12.

Figure 13:
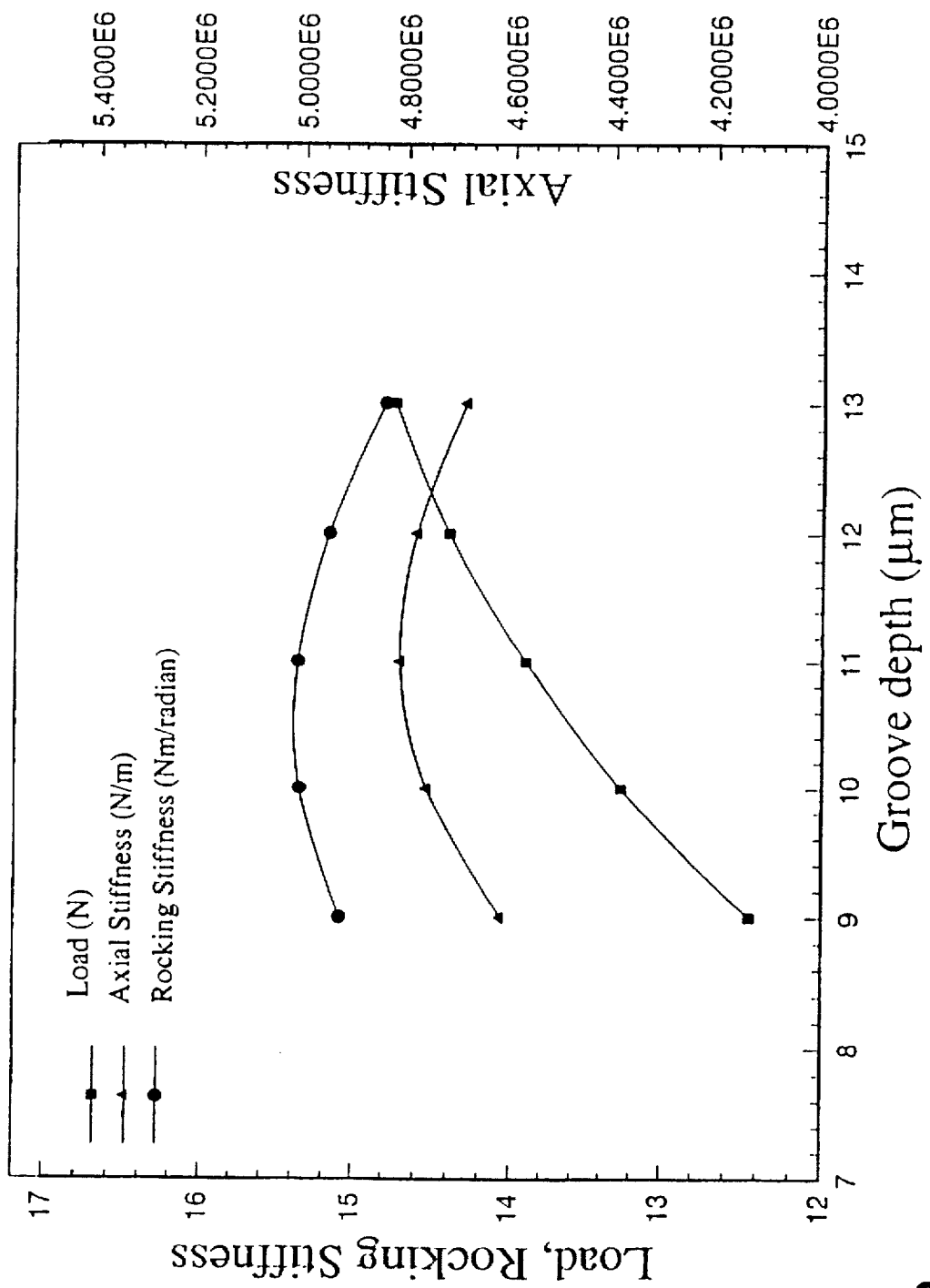
FIG. 13 is a graph illustrating the relationship between groove depth and bearing performance for a hydrodynamic bearing according to the invention.

The depth of the grooves 128 in the FIG. 9 bearing surface may also vary between approximately 9 μm and approximately 13 μm and is preferably 11 μm. The relationship between groove depth and bearing performance is illustrated in FIG. 13.

Figure 14:
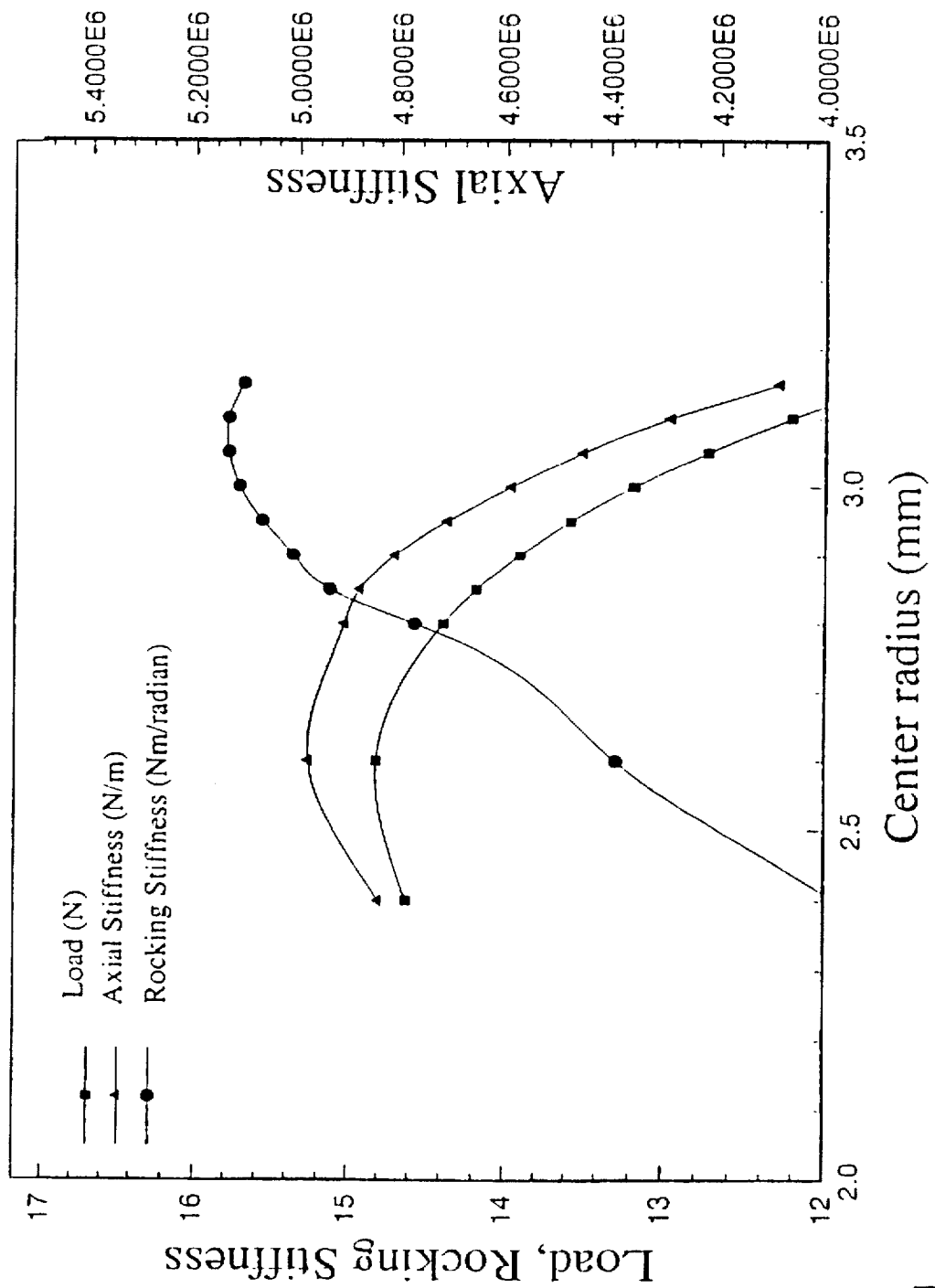
FIG. 14 is a graph illustrating the relationship between center radius and bearing performance for a hydrodynamic bearing according to the invention.

Another parameter which affects bearing performance is the location of the center radius 140. Because of the way the inner and outer grooves 130, 132 are arranged, they pump bearing fluid towards each other, i.e. towards the center radius 140. The location of the center radius determines the relative lengths of the of the inner and outer grooves 130, 132 and hence their relative pumping capacities. Bearing performance depends on the location of the center radius as shown in FIG. 14.

Figure 15:
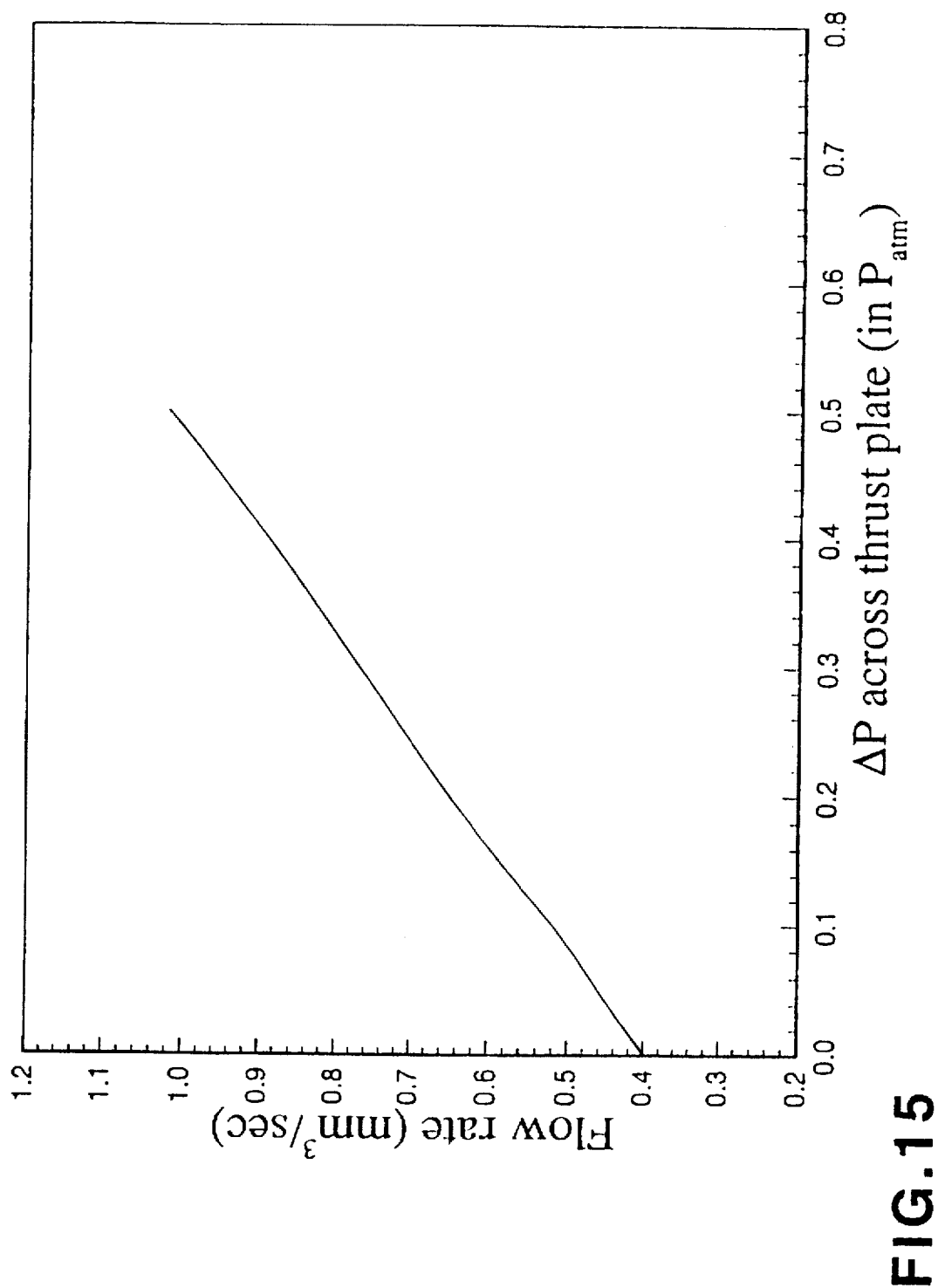
FIG. 15 is a graph illustrating the relationship between the pressure differential across a hydrodynamic bearing according to the invention and the flow rate across the bearing.

By varying the above parameters, in particular the location of the center radius 140, it is possible to create a difference in pressure ($\Delta P$) between the bearing fluid at the inner radius 124 and the bearing fluid at the outer radius 126. Such a pressure difference will create a net flow of bearing fluid across the bearing surface. By decreasing or increasing the $\Delta P$ across the bearing surface, the net flow and its direction across the bearing can be controlled. The relationship between the pressure difference and flow across the bearing is illustrated in FIG. 15.

Figure 16:
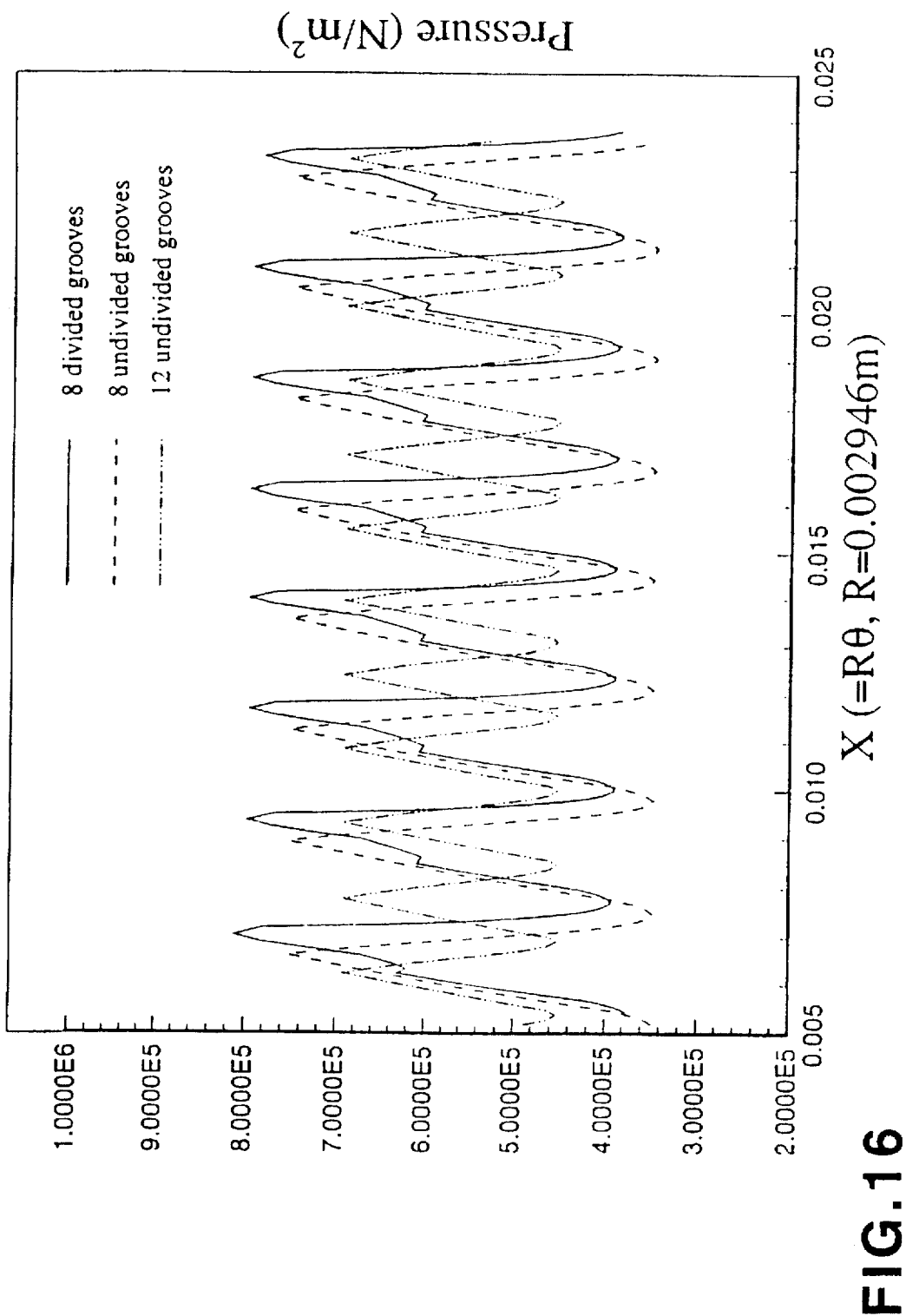
FIG. 16 is a graph illustrating the pressure distributions created by the bearing surfaces illustrated in FIGS. 2, 6, and 8.

Finally, FIG. 16 shows a comparison of the pressures generated in the bearing fluid by the hydrodynamic bearing surfaces illustrated in FIG. 2 (eight undivided grooves), FIG. 6 (twelve undivided grooves) and FIG. 8 (eight divided grooves). As can be seen from this figure, the hydrodynamic thrust bearing of the invention has an improved minimum pressure over the FIG. 2 embodiment and the highest peak pressure of the three bearing surfaces, while the overall pressure distribution has also improved.

Thus it can be seen that the hydrodynamic bearing surface of the invention not only provides an improvement in performance over the illustrated prior art bearing arrangements, but is also easier to manufacture.

It will be appreciated that the invention is not limited to the embodiment of the invention described above, and many modifications are possible without departing from the spirit and the scope of the invention. For example, additional intermediate lands 134 may be provided between adjacent continuous lands 122 to divide continuous groove 128 further.

What is claimed is:

1. A grooved hydrodynamic thrust bearing comprising first and second bearing surfaces being rotatable relative to one another and having a bearing fluid therebetween, the first bearing surface defining a plurality of continuous lands extending from an inner radius of the first bearing surface to an outer radius of the first bearing surface, adjacent ones of the continuous lands defining between them a continuous groove having an approximately constant depth and extending in unbroken fashion between the inner radius and the outer radius, the continuous groove comprising an undivided portion defined in an inner annulus of the first bearing surface and a divided portion defined in an outer annulus of the first bearing surface, the continuous groove being divided in the divided portion by an intermediate land located between the adjacent continuous lands, the divided portion of the continuous groove communicating in unbroken fashion with the undivided portion of the continuous groove.

2. A grooved hydrodynamic thrust bearing according to claim 1 wherein the continuous lands each comprise a first leg located in the outer annulus and a second leg located in the inner annulus, the first and second legs meeting at a center radius and being angled with respect to each other, the continuous lands defining together a curved herringbone pattern.

3. A grooved hydrodynamic thrust bearing according to claim 2 wherein the continuous lands each define an operatively leading edge and an operatively trailing edge, the operatively leading edge defining a smooth curve where the first and second legs meet.

4. A grooved hydrodynamic thrust bearing according to claim 3 wherein the operatively leading edge and operatively trailing edge of adjacent ones of the continuous lands meet in a smooth curve at the inner radius.

5. A grooved hydrodynamic thrust bearing according to claim 3 wherein the smooth curve defined by the operatively leading edge is a circular arc.

6. A grooved hydrodynamic thrust bearing according to claim 5 wherein the smooth curve defined by the operatively leading edge where the first and second legs meet is a circular arc having a radius of approximately 25 μm.

7. A grooved hydrodynamic bearing arrangement comprising:

a journal defining a journal bore and further defining a journal thrust surface extending transversely to the journal bore;

a shaft mounted in the journal bore, the shaft and the journal bore defining together a hydrodynamic journal bearing which permits rotation of the shaft and the journal relative to one another;

a thrust plate extending transversely from the shaft and defining first and second thrust surfaces, the first thrust surface and the journal thrust surface defining together a first hydrodynamic thrust bearing; and a counterplate mounted to the journal and defining a counterplate thrust surface, the counterplate thrust surface and the second thrust surface defining together a second hydrodynamic thrust bearing, at least one of the thrust surfaces of the first and second hydrodynamic thrust bearings being a grooved thrust surface defining a plurality of continuous lands extending from an inner radius of the grooved thrust surface to an outer radius of the grooved thrust surface, adjacent ones of the continuous lands defining between them a continuous groove having an approximately constant depth and extending in unbroken fashion between the inner radius and the outer radius, the continuous groove comprising an undivided portion in an inner annulus of the grooved thrust surface and a divided portion in an outer annulus of the grooved thrust surface, the continuous groove being divided in the divided portion by an intermediate land located between the adjacent continuous lands, the divided portion of the continuous groove communicating in unbroken fashion with the undivided portion of the continuous groove.

8. A grooved hydrodynamic bearing arrangement according to claim 7 wherein the continuous lands each comprise a first leg located in the outer annulus and a second leg located in the inner annulus, the first and second legs meeting at a center radius and being angled with respect to each other, the continuous lands defining together a curved herringbone pattern.

9. A grooved hydrodynamic bearing arrangement according to claim 8 wherein the continuous lands each define an operatively leading edge and an operatively trailing edge, the operatively leading edge defining a smooth curve where the first and second legs meet.

10. A grooved hydrodynamic bearing arrangement according to claim 9 wherein the operatively leading edge and operatively trailing edge of adjacent ones of the continuous lands meet in a smooth curve at the inner radius.

11. A grooved hydrodynamic bearing arrangement according to claim 9 wherein the smooth curve defined by the operatively leading edge is a circular arc.

12. A grooved hydrodynamic bearing arrangement according to claim 11 wherein the smooth curve defined by the operatively leading edge where the first and second legs meet is a circular arc having a radius of approximately 25 μm.

* * * * *